J. G. SCHMITZ.
STEERING MECHANISM FOR AGRICULTURAL MACHINERY.
APPLICATION FILED MAY 25, 1916.
1,200,991.
Patented Oct. 10, 1916.
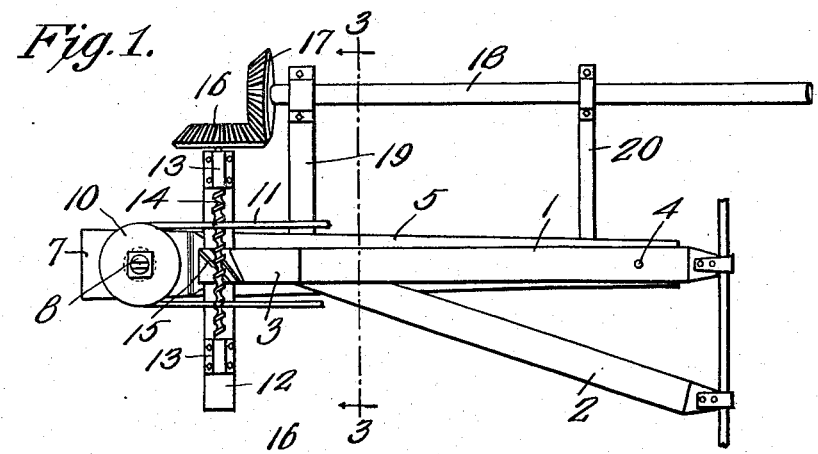
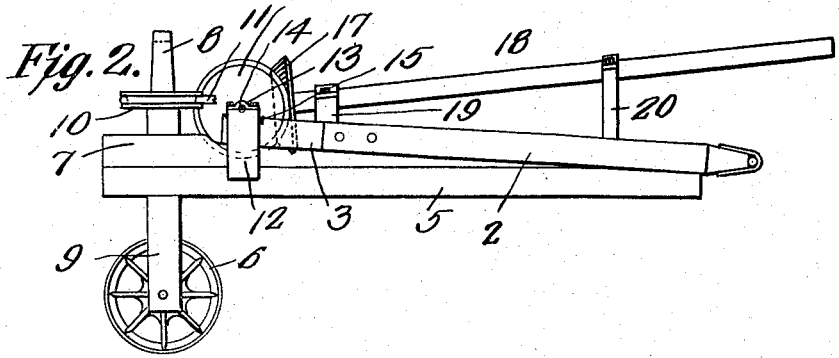
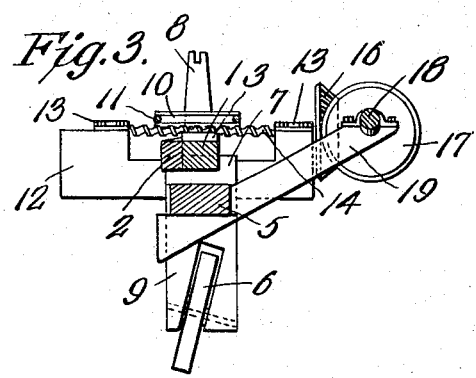
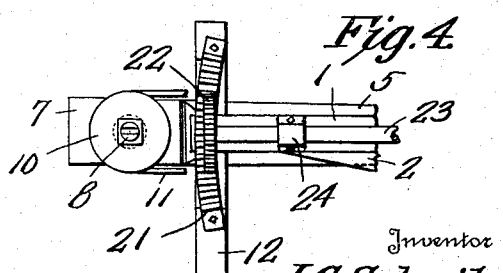
Inventor
J. G. Schmitz,

UNITED STATES PATENT OFFICE.

JACOB G. SCHMITZ, OF MEDICINE LAKE, MONTANA.

STEERING MECHANISM FOR AGRICULTURAL MACHINERY.

1,200,991.  Specification of Letters Patent.  Patented Oct. 10, 1916.

Application filed May 25, 1916. Serial No. 99,805.

*To all whom it may concern:*

Be it known that I, JACOB G. SCHMITZ, a citizen of the United States, residing at Medicine Lake, in the county of Sheridan, State of Montana, have invented certain new and useful Improvements in Steering Mechanisms for Agricultural Machinery; and I do hereby declare the following to be a full, clear and exact description of the invention, such as will enable others skilled in the art to which it appertains to make and use the same.

This invention relates to the class of steering mechanisms for agricultural machinery, and has particular reference to a piloting apparatus for plow tractors.

The primary object of my invention is to provide a piloting mechanism for tractors which are used in uneven and rolling countries. When traction engines are used for plowing purposes in hilly or rolling country it has been my experience that the traction engine has a tendency to slide laterally down hill, and the pilot wheel which must hug the edge of the furrow to properly steer the plow, must be turned out of the furrow until the engine can be brought back into line. Furthermore, where the land slopes away from the furrow, and the engine shows a tendency to slide down hill, it is often necessary to run the pilot wheel upon the plowing in order to position the engine. In keeping the engine in line under the above mentioned difficulties, the operator is required to watch the pilot wheel very closely, and even then in switching the pilot wheel out of and into the furrow, it is necessary to give the pilot wheel a decided turn, so that when the pilot wheel clears the furrow, the engine will be jumped a considerable distance out of line before the pilot wheel can be straightened, so that an unplowed area is left or else the plows are dragged through the land already plowed.

By the mechanism provided by my invention, the above difficulties are lessened, in that the operator has a positive control of the pilot wheel, and can adjust its position to a much finer degree than has been capable of those mechanisms which are known to me.

A further object of the invention is to provide a steering mechanism of the type hereinabove mentioned which will possess all the positiveness of action required without any complication of elements.

The mechanism constitutes, in effect, an auxiliary control for the usual pilot wheel, and does not interfere with the usual steering apparatus which is applied for the manipulation of pilot wheels.

With the above and other objects in view, as will hereinafter appear my invention will now be fully set forth and described, reference being had to the accompanying drawings.

In said drawings:—Figure 1 is a plan view of the steering mechanism of my invention, Fig. 2 is a side elevation, Fig. 3 is a transverse section on line 3—3 of Fig. 1 looking in the direction of the arrow, and Fig. 4 is a detail plan view of a modification.

Referring more particularly to said drawings 1 and 2 denote the arms of a triangular frame which extends forwardly from the axle of a traction engine. Said arms 1 and 2 are rigidly joined at the forward extremity of the latter, but the arm 1 is provided with the extension 3. At a point behind the juncture of the beams 1 and 2, the arm 1 is provided with a stub bolt 4, and upon said bolt 4 is pivoted the beam 5, said beam extending forwardly below the arm 1, and providing a carriage for the pilot wheel 6. The forward end of the beam 5 carries the journal box 7 through which extends the vertical shaft 8 of the pilot wheel yoke 9. The upper end of the shaft 8 is squared to receive the cable wheel 10. Said cable wheel 10 is of the ordinary curved rim type, around which is fastened the cable 11 which is then led rearwardly to the operator's seat. Mounted transversely of the beam 5 is a frame 12 having the journal bearings 13, in which are mounted the ends of a worm shaft 14. Below the worm shaft 14, the frame 12 provides a clear space into which the extension 3 may swing laterally of the frame, and the upper face of said extension 3 is provided with worm gear teeth 15 which mesh with the worm shaft 14. It will be evident that as the worm shaft 14 is rotated, the beam 5 providing the carriage for the pilot wheel 6 will be swung laterally relative to the beams 1 and 2. One end of the worm shaft 14 is provided with an extension upon which is mounted the beveled gear 16 which meshes with a similar gear 17 mounted upon a steering shaft 18. Said steering shaft extends rearwardly to a point adjacent the driver's seat, and is supported at its forward end in a bearing in the transversely extending bracket 19 suitably mounted upon the beam 5 and upon an auxiliary bracket 20 mounted adjacent the rear end of the beam 5.

From the foregoing description it will be clear that while the pilot wheel 6 is provided with the usual means operated from the driver's seat for turning the pilot wheel into and out of the furrow, my invention also provides an auxiliary adjustment for the steering mechanism whereby the relative angular position of the pilot wheel to the rigid frame formed by the arms 1 and 2 may be changed, so that when it becomes necessary to run the engine to one side or the other of the normal line of drive, the pilot wheel may be adjusted within limits laterally of the engine, so that the pilot wheel may still retain its position in the furrow, to carry out its function of steering the engine along the proper plowing line.

The operation of the apparatus is obvious from the foregoing, it being merely necessary in adjusting the pilot wheel to a new lateral position to rotate the steering shaft 18 in one direction or the other to swing the beam 5 laterally of the arms 1 and 2 whereby the pilot wheel will be brought into a position of adjustment which accommodates the engine to the irregularities of the ground while still permitting the pilot wheel to run in the furrow.

In the modification shown in Fig. 4, the beam 5 supports the frame 12 as in the above form, said frame 12 has mounted upon its top face the arcuate rack plate 21, and meshing therewith is the gear pinion 22 keyed on the end of the steering shaft 23, the latter in this instance is mounted at its forward end, in journal 24 mounted on the beam 5. When the shaft 23 is rotated, its pinion 22 operating over the rack plate 21, swings the beam 5 relatively to the arm 1, so that the same results secured by the hereinbefore described arrangement are attained.

What I claim as my invention is:

1. The combination with a traction engine, of a frame extending forwardly from said engine, a pilot wheel, a carriage supporting said pilot wheel and pivoted to said frame to swing transversely thereof, means for steering said pilot wheel, and manually controlled means interposed between the frame and the carriage for swinging said carriage on its pivot relative to said frame.

2. The combination with a traction engine, of a frame extending forwardly from said traction engine, a pilot wheel, a carriage supporting said pilot wheel pivotally carried by said frame, a worm shaft mounted upon said carriage, gear teeth carried by said frame and meshing with said worm shaft, means for operating said worm shaft from the engine, and means for steering said pilot wheel.

3. The combination with a traction engine, of a frame extending forwardly from said engine, a beam pivotally mounted upon said frame for lateral movement, and constituting a carriage for the pilot wheel, a pilot wheel journaled upon said carriage, means for actuating said pilot wheel from the engine, a worm shaft rotatably mounted upon said carriage, an extension on said frame having gear teeth meshing with said worm shaft, and a steering shaft extending forwardly from said engine and geared to said worm shaft for adjusting the position of said carriage relative to said frame.

In testimony whereof, I affix my signature, in the presence of two witnesses.

JACOB G. SCHMITZ.

Witnesses:
OLA M. VANCE,
EDW. S. POWERS.

Copies of this patent may be obtained for five cents each, by addressing the "Commissioner of Patents, Washington, D. C."